(12) United States Patent
Eijk

(10) Patent No.: US 9,354,072 B2
(45) Date of Patent: May 31, 2016

(54) METHOD AND SYSTEM FOR OBTAINING EMISSION AND FUEL CONSUMPTION DATA

(75) Inventor: Arjan Rudolf Alexander Eijk, Delft (NL)

(73) Assignee: Nederlandse Organisatie voor toegepast-natuurwetenschappelijk onderzoek TNO, Delft (NL)

(*) Notice: Subject to any disclaimer, the term of this patent is extended or adjusted under 35 U.S.C. 154(b) by 0 days.

(21) Appl. No.: 14/344,748

(22) PCT Filed: Sep. 13, 2012

(86) PCT No.: PCT/NL2012/050643
§ 371 (c)(1),
(2), (4) Date: Jul. 18, 2014

(87) PCT Pub. No.: WO2013/039392
PCT Pub. Date: Mar. 21, 2013

(65) Prior Publication Data
US 2015/0025785 A1 Jan. 22, 2015

(30) Foreign Application Priority Data

Sep. 13, 2011 (EP) .................................... 11181135

(51) Int. Cl.
*G06F 15/18* (2006.01)
*G01C 21/34* (2006.01)

(52) U.S. Cl.
CPC ............ *G01C 21/3469* (2013.01); *G01C 21/34* (2013.01)

(58) Field of Classification Search
USPC .......................... 701/24, 26, 36, 123; 340/439
See application file for complete search history.

(56) References Cited

U.S. PATENT DOCUMENTS

| 8,862,374 B2 * | 10/2014 | Maura ................ G01C 21/3697 701/123 |
| 2011/0196817 A1 * | 8/2011 | Pryakhin ................ G01C 21/26 706/14 |

FOREIGN PATENT DOCUMENTS

| EP | 2354762 A1 | 8/2011 |
| WO | 2010074668 A1 | 7/2010 |

OTHER PUBLICATIONS

International Search Report—PCT/NL2012/050643—Mailing date: Jan. 17, 2013.
Cornelis Johannes Theodorus van de Weijer, Heavy-Duty Emission Factors: Development of representative driving cycles and prediction of emissions in real-life, Delft, Oct. 1997.

* cited by examiner

*Primary Examiner* — Adam Tissot
(74) *Attorney, Agent, or Firm* — Banner & Witcoff, Ltd.

(57) ABSTRACT

A method is presented for obtaining emission and/or fuel consumption data associated with a road segment. The method comprises the steps of receiving (S1) at least position data from a vehicle, determining (S2) a respective value for at least a first and a second parameter indicative for a movement of the vehicle, storing (S3) a frequency distribution having classes for combinations of value ranges for said at least a first and a second parameter, updating (S4) a frequency count for a class of said frequency distribution corresponding to the determined values for said at least a first and a second parameter, repeating (S5) the previous steps calculating (S6) an expected emission and/or fuel consumption for a typical vehicle on said road segment on the basis of an emission or fuel consumption model that indicates the emission or fuel consumption as a function of the value of the at least a first and a second parameter weighted by the relative frequencies with which said values occur in the frequency distribution.

10 Claims, 5 Drawing Sheets

METHOD AND SYSTEM FOR OBTAINING EMISSION AND FUEL CONSUMPTION DATA

CROSS-REFERENCE TO RELATED APPLICATIONS

This application is a U.S. National Stage application under 35 U.S.C. §371 of International Application PCT/NL2012/050643(published as WO 2013/039392A1), filed Sep. 13, 2012, which claims priority to Application EP 11181135.2, filed Sep. 13, 2011. Benefit of the filing date of each of these prior applications is hereby claimed. Each of these prior applications is hereby incorporated by reference in its entirety.

BACKGROUND OF THE INVENTION

1. Field of the Invention

The present invention relates to a method for obtaining emission and fuel consumption data associated with a road segment.

The present invention further relates to a system for obtaining emission and fuel consumption data associated with a road segment.

The present invention further relates to a route planning method.

The present invention further relates to a route planning system.

2. Related Art

It is recognized nowadays that emission of exhaust gases such as CO, CO2, SO2 and NOx of vehicles as well as fuel consumption should be reduced. The selection of the vehicle and the behaviour of the driver is important in this respect. Generally speaking it is advisable to avoid large accelerations and a high driving speed to keep fuel consumption and gas emissions low. However, driving behaviour is for a large part determined by the road conditions. Accordingly it is desired to have means facilitating a driver in selecting a route that provides suitable conditions for a driving style suitable for a low fuel consumption and a low gas emission. For example, the amount of accelerations may be minimized by selecting a route having a low number of traffic lights.

SUMMARY OF THE INVENTION

In accordance with the present invention a method is provided as claimed in claim 1.

According to this method an average emission quantity and/or fuel consumption data is determined for a plurality of road segments. A road segment may correspond to a part or the whole of a road. A road segment has a predetermined driving direction with respect to a length axis of the road. In case a road has multiple driving lanes with the predetermined driving direction, a segment may include all or some of these driving lanes. Alternatively driving lanes may be assigned to respective segments. This data can be used in a route planning method to plan a route that minimizes emission quantity and/or fuel consumption when travelling from an origin to a destination.

In the method according to the present invention at least position data from a vehicle is determined to associate the use of said vehicle with a particular road segment. Respective values are determined for at least a first and a second parameter indicative for a movement of the vehicle. Suitable parameters are for example the velocity and the acceleration of the vehicle. The values of these parameters may be determined by differentiating the position data, or by direct measurement with a speedometer, an accelerometer etc. Another example of such a parameter is the product of speed and acceleration.

In the method according to the present invention a frequency distribution is stored having classes for combinations of value ranges for said at least a first and a second parameter. In case the first and the second parameter are velocity and acceleration, the frequency distribution is two-dimensional, having classes for combinations of velocity ranges and acceleration ranges. The classes may have the same size, but alternatively the classes may have sizes dependent on the average value for the first and or the second parameter for said class.

A new tuple of values obtained for said at least a first and second parameter is used to update a frequency count for a class of said frequency distribution corresponding to the determined values for said at least a first and a second parameter.

This process is repeated so that an accumulated frequency distribution is obtained for the at least a first and a second parameter for said road segment.

Subsequently the expected amount As of emission and/or fuel consumption for a typical vehicle on said road segment s is calculated on the basis of an emission or fuel consumption model $f_A(i1, i2, \ldots in)$ that indicates the emission or fuel consumption as a function of the value of the at least a first and a second parameter i1, i2 weighted by the relative frequencies $F(i1, i2, \ldots in)$ with which said values occur in the frequency distribution.

$$As = \sum_{i1,i2,\ldots in} F(i1, i2, \ldots in) \cdot f_A(i1, i2, \ldots in) \Big/ \sum_{i1,i2,\ldots in} F(i1, i2, \ldots in) \quad (1)$$

Accordingly the expected amount As of emission and/or fuel consumption for a typical vehicle on said road segment s is calculated directly from the automatically obtained frequency distribution.

In a route planning method to determine a route from an origin to a destination this data can be used to estimate the total amount Aroute, i.e. total fuel consumption or the total emission of exhaust gases for a particular route by summation of the amounts As for each of the road segments comprised in said route:

$$A_{route} = \sum_s As \quad (2)$$

The route planning method can subsequently select a route from candidate routes with respect to said criterion, i.e. the route from origin to destination that has the lowest value for As in a way analogously to the way a conventional route planning method determines a route having the lowest value for the distance.

Alternatively the route planning method may take into account a plurality of criteria. This may be realised in that an overall distance factor Dd is introduced that is a weighted sum of the various parameters taken into account. For example, $$Dd = c1 \cdot D + c2 \cdot A_{route,e} + c3 \cdot A_{route,f} \quad (3)$$

Therein D is the physical distance, i.e. the total length of a candidate route, $A_{route,e}$ is the estimated emission for said candidate route and $A_{route,f}$ is the estimated fuel consumption for said candidate route.

This can be used in the route planning method to select a route that is optimized with respect to at least one criterion, said at least one criterion being minimization of a total fuel consumption for said route on the basis of fuel consumption data for individual road segments or minimization of a total emission for said route on the basis of emission data for individual road segments.

According to a further aspect of the present invention a system is provided for obtaining emission and/or fuel consumption data associated with a road segment.

According to a still further aspect of the invention a route planning system for determining a route from a first to a second location is provided.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, although the terms first, second, third etc. may be used herein to describe various elements these elements, should not be limited by these terms. These terms are only used to distinguish one element, from another element. Thus, a first element, discussed below could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the methods, and examples are illustrative only and not intended to be limiting.

Figure 1:
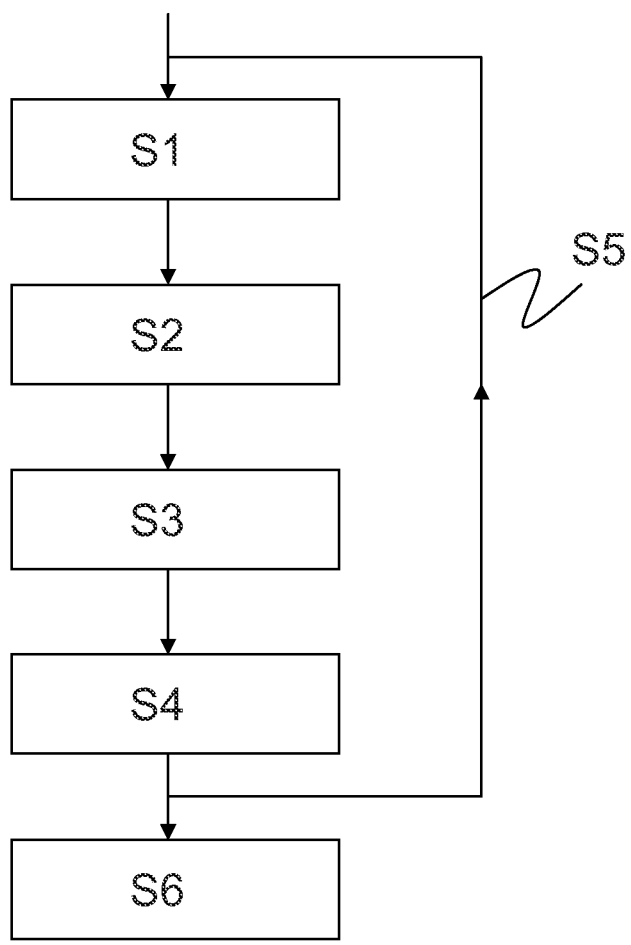
FIG. 1 shows an embodiment of a method according to the invention for obtaining emission and fuel consumption data associated with a road segment.

FIG. 1 schematically shows a method for obtaining emission and/or fuel consumption data associated with a road segment, the method comprising the steps of receiving (S1) at least position data from a vehicle, determine (S2) a respective value for at least a first and a second parameter indicative for a movement of the vehicle, storing (S3) a frequency distribution having classes for combinations of value ranges for said at least a first and a second parameter, updating (S4) a frequency count for a class of said frequency distribution corresponding to the determined values for said at least a first and a second parameter, repeating (S5) the previous steps calculating (S6) an expected emission and/or fuel consumption for a typical vehicle on said road segment on the basis of an emission or fuel consumption model that indicates the emission or fuel consumption as a function of the value of the at least a first and a second parameter weighted by the relative frequencies with which said values occur in the frequency distribution.

Step S6 may be carried out if the sequence of steps S1-S4 has been executed at least once. However, the accuracy of the estimation of As is improved if steps S1-S4 are repeated S5 a plurality of times.

The position p of a vehicle may be determined for example by a satellite based navigation system, such as GPS or the Galileo system. Alternatively, or in addition autonomous navigation methods may be used, for example using a compass, an odometer, accelerometers, and/or gyroscopes. Subsequently parameters indicative for a movement of the vehicle may be derived from the position as a function of time. For example the velocity v of the vehicle is obtained by differentiation of the position p once in time ($v=dp/dt$) and the acceleration a is obtained by differentiation of the position p twice in time ($a=d^2p/dt^2$). Other parameters can be deduced, for example the product v.a of velocity and acceleration.

Alternatively, such parameters may be determined by a sensor forming part of the vehicle, such as a speedometer. The vehicle may also be equipped with an accelerometer for determining an acceleration, but instead, the acceleration may be determined by differentiating time a value of the speed determined by the speedometer. This step of differentiating may take place within the vehicle or within a separate system that receives a signal indicative for the measured speed.

Figure 2:
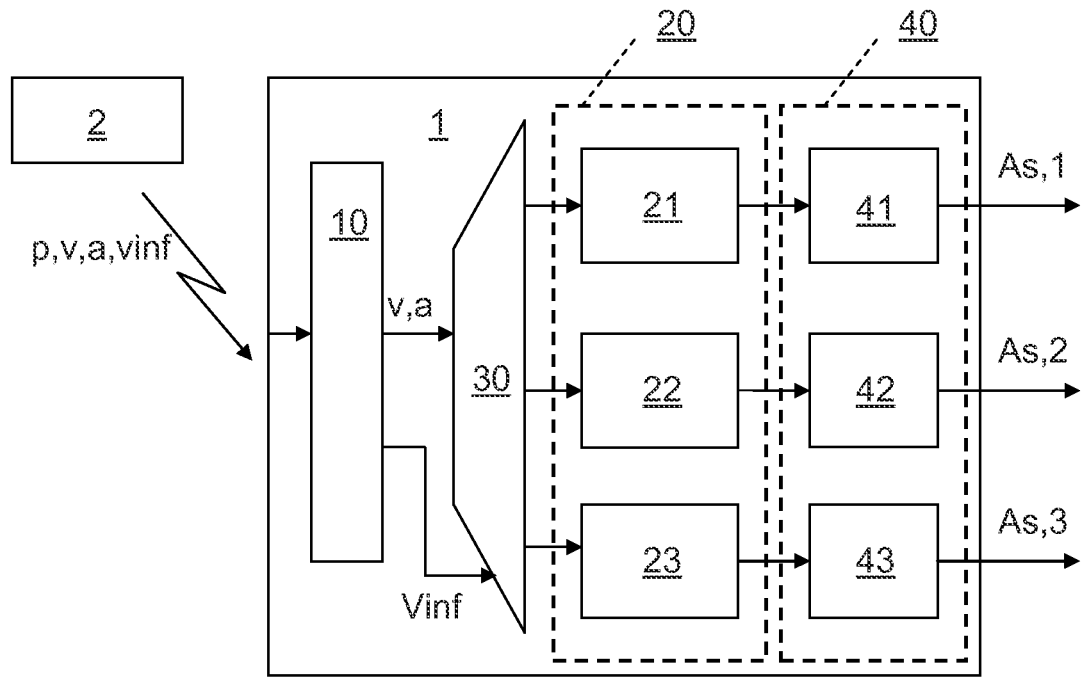
FIG. 2 shows a first embodiment of a system according to the invention.

FIG. 2 schematically shows a system 1 according to the present invention for obtaining emission and/or fuel consumption data associated with a road segment. The system comprises a receiving facility 10 for receiving at least position data from vehicles 2. In the example shown the vehicle 2 has a GPS unit and a transmitter that transmits an indication p of the position of the vehicle determined by said GPS unit. The transmitter of the vehicle 2 further transmits an indication v of the vehicle's speed determined by a speedometer and an indication of the vehicle's acceleration a determined by an accelerometer. The transmitter further transmits information vinf about the vehicle. The information vinf may for example indicate the weight of the vehicle, the kind of fuel used by the vehicle. Alternatively or in addition the information vinf may include other information about the vehicle, such as the manufacturer, the vehicle type and the manufacturing date.

The system may use this other information to determine the weight of the vehicle and the type of fuel used, for example from a lookup table.

The system 1 further comprises a storage facility 20 for storing a frequency distribution 21, 22, 23 having classes for combinations of value ranges for at least a first and a second parameter indicative for a movement. In this embodiment the storage facility has three frequency distributions, a first distribution 21 for vehicles having a weight less than 1000 kg, a second distribution 22 for vehicles having a weight in the range of 1000 to 5000 kg and a third distribution 23 for vehicles having a weight larger than 5000 kg. Preferably the storage facility also includes a respective vehicle counter associated with each of the frequency distributions 21, 22, 23. A vehicle counter associated with a frequency distribution counts the number of vehicles on which the frequency distribution is based. This number is indicative for the accuracy of the distribution. The absolute frequency count may be divided by the counted number of vehicles to obtain a relative frequency count.

Figure 3:
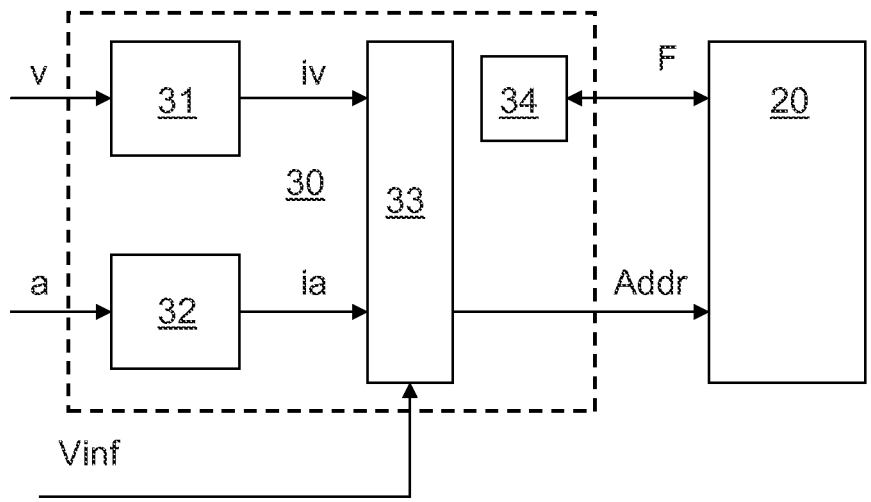
FIG. 3 shows a part of the system of FIG. 2 in more detail.

The system further includes an update facility 30 for updating a frequency count for a class of said frequency distribution corresponding to determined values of said at least a first and a second parameter for vehicles for which said position data is received. An embodiment of the update facility 30 is shown in more detail in FIG. 3. The update facility 30 shown therein comprises a first classification facility 31 that determines a speed class iv from the indication of the speed v and a second classification facility 32 that determines an acceleration class ia from the indication of the acceleration a.

The speed may for example be classified in classes having a size of 2 m/s. For example class iv=n corresponds to a speed in the range of 2(n−1) to 2n m/s. For example class iv=1 corresponds to a speed of 0-2 m/s, class iv=2 corresponds to a speed of 2-4 m/s etc. Additionally a separate class may be provided for v=0.

The acceleration may for example be classified in classes having a size of 0.2 m/s². For example class iv=n corresponds to an acceleration in the range of 0.2(n−1) to 0.2n m/s. For example class ia=1 corresponds to an acceleration of 0-0.2 m/s, class ia=2 corresponds to an acceleration of 0.2-0.4 m/s etc. Additionally a separate class may be provided for a=0.

Dependent on the type of the vehicle, the update facility 30 selects the appropriate frequency distribution and addresses the cell in this distribution that corresponds to the movement of the vehicle as indicated by the at least a first and the second parameter. Address calculation unit 33 calculates the address Addr of the cell within storage facility 20. Subsequently the frequency in this cell is updated by frequency update unit 34. Updating may imply increasing the frequency stored in the addressed cell by 1, i.e.:

$$F(i1, i2, \ldots in) = F(i1, i2, \ldots in) + 1 \quad (4a)$$

Instead of merely incrementing the matrix to obtain an absolute count for each of the cells in the matrix, a relative count may be calculating by dividing the absolute count for each of the cells by the total count for all cells.

$$F'(i1, i2, \ldots in) = \frac{F(i1, i2, \ldots in)}{\sum_{i1,i2,\ldots in} F(i1, i2, \ldots in)}$$

Alternatively the frequency F may be updated according to a weighting factor:

$$F(i1, i2, \ldots in) = \alpha F(i1, i2, \ldots in) + (1-\alpha) \quad (4b)$$

In this way the frequency in the table is gradually adapted to changing traffic situations. For example in time the traffic density may increase for a particular road segment, resulting in lower speeds and more frequent accelerations and decelerations. A low value of $\alpha$ results in a quick adaptation but a large sensitivity for random fluctuations. With a high value of $\alpha$ the random fluctuations are averaged out, but the system adapts relatively slowly. A reasonable choice is to select a value of $\alpha$ corresponding to an adaptation time in the order of a year.

The system further includes a calculation facility 40 for calculating according to expression 1 above an expected emission or fuel consumption for a typical vehicle on said road segment on the basis of an emission or fuel consumption model 41, 42, 43 that indicates the emission or fuel consumption as a function of the value of the at least a first and a second parameter weighted by the relative frequencies with which said values occur in the frequency distribution.

The model $f_A(i1, i2, \ldots in)$ used may have the form of a lookup table having for each combination of classes an expected value for the emission or the fuel consumption. Alternatively the model may describe a continuous relation between the value As and the value of the input parameters i1, i2, ... in.

Figure 4:
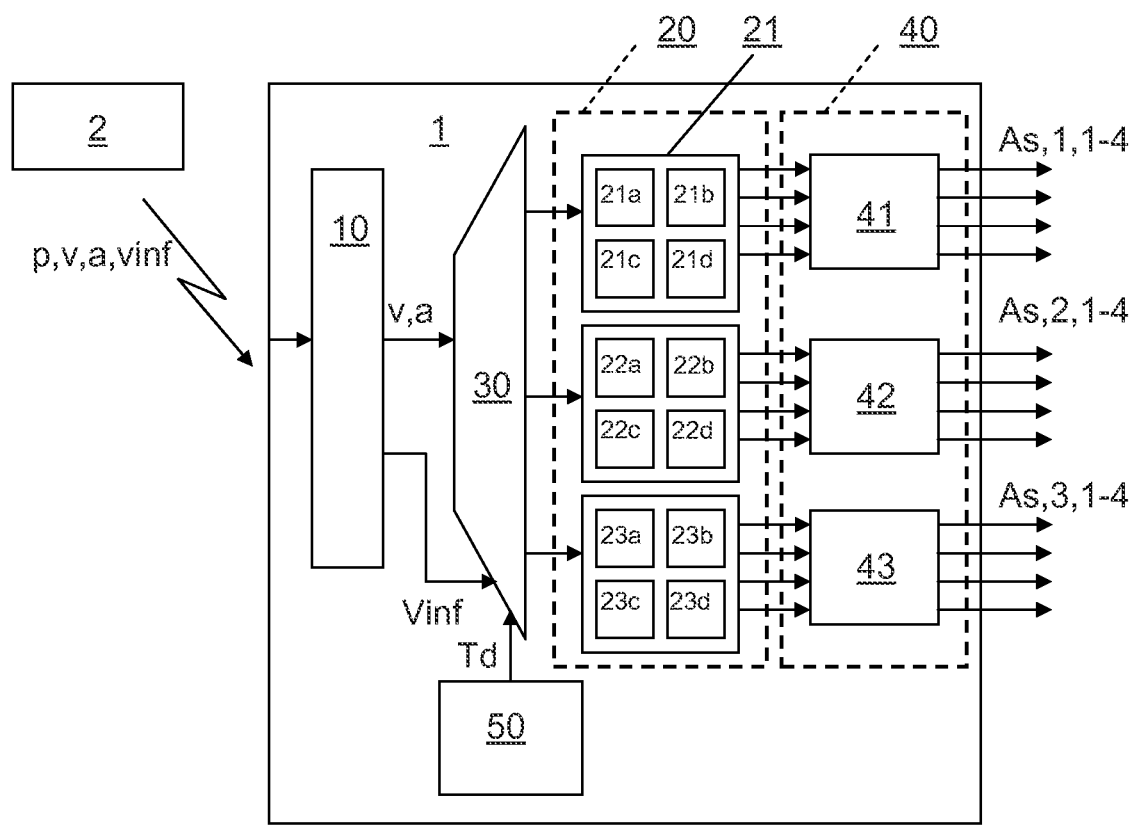
FIG. 4 shows a second embodiment of a system according to the invention.

It is known that the traffic circumstances are strongly dependent on the time of the day. In order to have a more representative frequency distribution for a particular time of the day, a second embodiment of the system selects the frequency distribution to be updated from a plurality of frequency distributions on the basis of the time of the day indicated by a second indication. Such an embodiment is shown in FIG. 4. The embodiment shown in FIG. 4 comprises time of day indication unit 50 that generates a time of day signal Td. Unit 50 is for example a clock that generates the time of day signal in terms of hours and minutes, and the update unit 30 classifies this into a time of day class, e.g. 7-9 AM (class it=1), 9 AM-4 PM (class it=2), 4 PM to 7 PM (class it=3) and 7 PM to 7 AM (class it=4). Alternatively the time of day indication unit 50 may already provide a class index it that directly indicates a time class. Dependent on the class index it, the update unit 30 selects a different frequency distribution to be updated. For example for a vehicle of type 1, the update unit 30 selects frequency distribution 21a, 21b, 21c, 21d for time class index it=1, 2, 3, 4. Likewise for a vehicle of type 2, the update unit 30 selects frequency distribution 22a, 22b, 22c, 22d for time class index it=1, 2, 3, 4. For a vehicle of type 3, the update unit 30 selects frequency distribution 23a, 23b, 23c, 23d for time class index it=1, 2, 3, 4. Calculation unit 40 calculates an expected emission and/or fuel consumption for each type of vehicle, for each time of the day class. For a particular vehicle type, the same model can be used for each time of the day class. For example model 41 is used to calculate an expected emission As, 1, 1-4 for vehicles of type 1 for each of the four time class indices.

Separate frequency distributions may further be provided for different days of the week. For example a first day of the week class id=1 comprises Monday to Friday, a second day of the week class id=2 comprises Saturday, and a third day of the week class id=3 comprises Sunday.

In an embodiment wherein multiple frequency distributions are obtained for respective observations a comparison is made between these multiple frequency distributions to estimate a reliability interval for respective classes of the distribution. In this way it can be determined whether the effect of various circumstances is large enough to justify such separate frequency distributions.

For example respective frequency distributions may be obtained for data observed for vehicles on various days of the midweek. For each class 5 frequency values are obtained, which are normalised to obtain relative frequency values. Based on the 5 frequency values an average frequency value and a reliability interval for the average frequency interval can be obtained. In an embodiment the said multiple frequency distributions are obtained for comparable circumstances. Comparable circumstances are considered circumstances for which there is no reason to expect a systematic deviation of the observed frequency distribution, e.g. the same weight class, the same day of the week, the same time of the day. Data observed for comparable circumstances may be alternatingly assigned to one of the multiple frequency distributions. For example the observed data may be assigned according to a random or a deterministic assignment scheme. By comparison of the relative frequency for corresponding classes of these multiple frequency distributions an estimation can be made of the random error in the observed frequencies.

Figure 5:
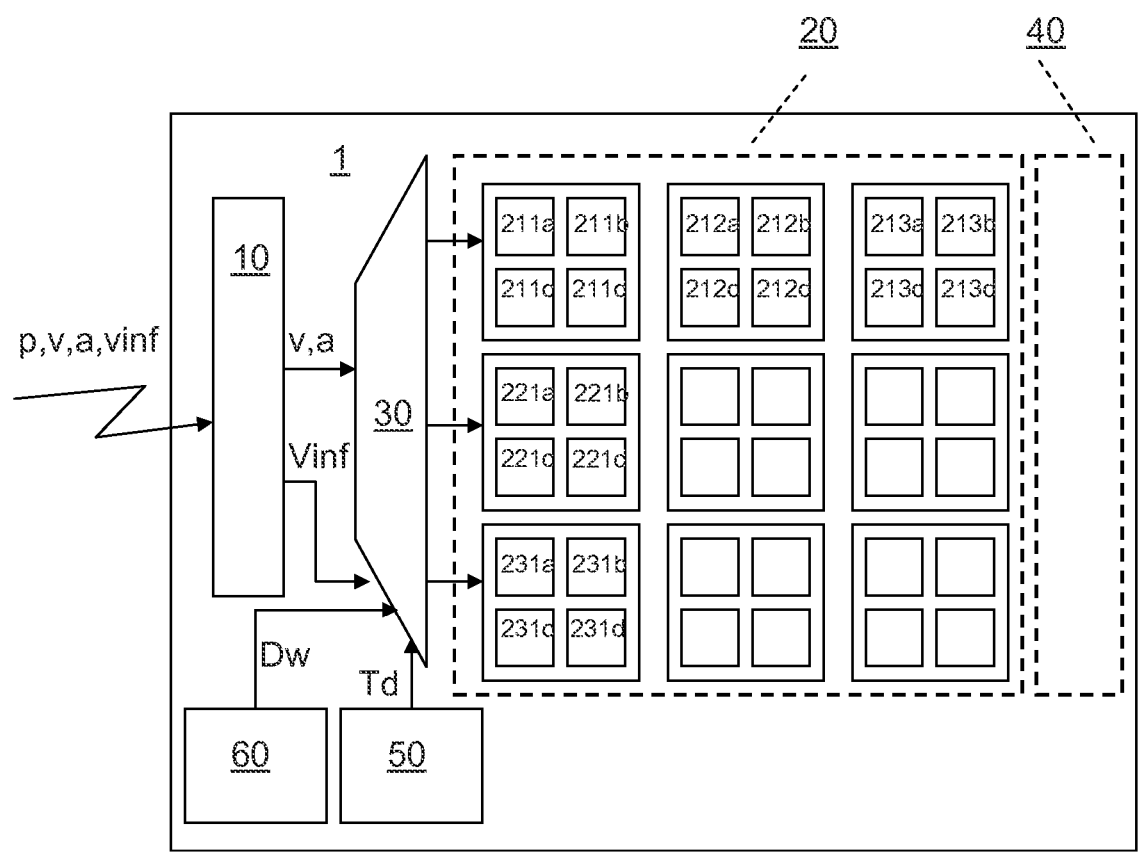
FIG. 5 shows a third embodiment of a system according to the invention.

An embodiment of a system that maintains these frequency distributions and calculates an expected emission and/or fuel consumption for each vehicle type, each time of the day class and each day of the week class is shown in FIG. 5. In the embodiment shown the system has a day of the week indication unit 60. In the embodiment shown therein the storage facility 20 of the system stores frequency distributions $211a, \ldots, 211d$ for time of the day classes it in week class id=1.

Unit 60 is for example a calendar clock unit that generates the day of the week signal Dw indicating the current day of the week, and the update unit 30 classifies this into a day of the week class id. Alternatively the day of the week indication unit 60 may already provide a class index id that directly indicates a day class. Dependent on the class index id, the update unit 30 selects a different frequency distribution to be updated. In the reference nr. used in this example, the second digit indicates the vehicle class, the third digit indicates a time of the week and the suffix $a, \ldots, d$ indicates the respective timeclass indices $1, \ldots, 4$. For example for a vehicle of type 1, the update unit 30 selects frequency distribution $211a, 211b, 211c, 211d$ for time class index it=1, 2, 3, 4 and day of the week class id=1, selects frequency distribution $212a, 212b, 212c, 212d$ for time class index it=1, 2, 3, 4 and day of the week class id=2, and selects frequency distribution $213a, 213b, 213c, 213d$ for time class index it=1, 2, 3, 4 and day of the week class id=3. Analogously a proper frequency distribution is selected for each of the other vehicle types, for example frequency distribution $221a, 221b, 221c, 221d$ etc for vehicles of type 2 and $231a, 231b, 231c, 231d$ etc for vehicles of type 3. Calculation unit 40 calculates an expected emission and/or fuel consumption for each type of vehicle, for each time of the day class and for each day of the week class. For a particular vehicle type, the same model can be used for each time of the day class and each day of the week class. For example model 41 (FIG. 4) is used to calculate an expected emission As,1, 1-4 for vehicles of type 1 for each of the four time class indices. For clarity calculation unit 40 is not shown in detail in FIG. 5.

Figure 6:
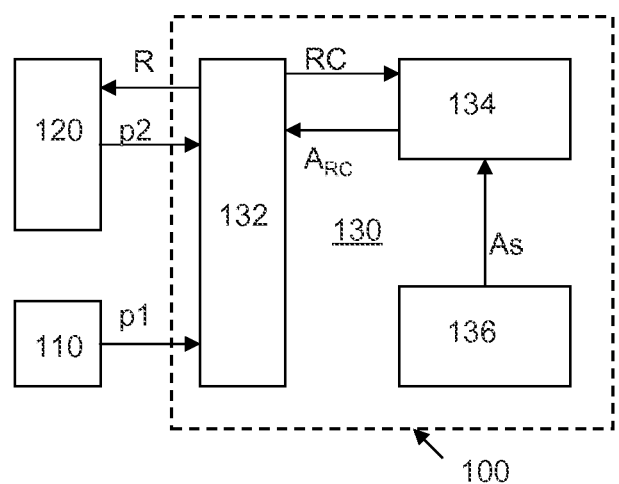
FIG. 6 shows an embodiment of a route planning system according to the present invention.

The estimated value As of the emission and/or fuel consumption can be used in a route planning system 100 as is illustrated in FIG. 6. The route planning system for determining a route from a first to a second location p1, p2 comprises a facility 110 for determining a first location (origin p1). This facility 110 is for example a GPS device that determines the actual position of a vehicle comprising the route planning system 100. The route planning system comprises an input facility 120 for inputting a second location (destination p2). The input facility 120 is for example a touch screen, a key board or a voice recognition system. The input facility 120 may also be used to specify a first location p1.

The route planning system 100 further comprises a computation facility 130 for determining a route R from said first location p1 to said second location p2 that is optimized with respect to at least one criterion, said at least one criterion being minimization of a total fuel consumption for said route on the basis of fuel consumption data for individual road segments or minimization of a total emission for said route on the basis of emission data for individual road segments. The computation facility 130 comprises a first module 132 that is capable of generating candidate routes RC. A second module 134 of the computation facility calculates an expected emission or an expected fuel consumption $A_{RC}$ for said candidate routes RC. Based on the expected values $A_{RC}$, the first module 132 selects an optimum route from said candidate routes RC. The second module 134 calculates the expected emission or an expected fuel consumption $A_{RC}$ for each route from the expected value As for the particular type of vehicle involved. This data is obtained with the system according to the present invention, for example the system shown in FIG. 2, 4 or 5 and stored in storage module 136.

Various criteria may be combined. Other optimization criteria are for example the minimization of a travelled distance or minimization of a travelled time. Up to some extent these optimization criteria are mutually non conflicting. For example usually travelling a shorter distance results in a lower power consumption and a lower emission. However, even routes mutually having a comparable length may cause a mutually different fuel consumption. For example one of the routes may have a large number of traffic lights, necessitating a frequent accelerating/de-accelerating of the vehicle, causing a higher fuel consumption and a higher emission of gases such as CO and NOx. In an embodiment the route planning module 100 may select a route using a weighted cost measure, based on a combination of various criteria as indicated in equation 3. In an embodiment the weighting factors $c1, \ldots, cn$ therein depend on the accuracy with which the various parameters can be determined. Typically the weighting factor for a parameter positively depends on the accuracy of the parameter, or otherwise stated the weighting factor is a decreasing function of the size of the reliability interval for a parameter. The accuracy of parameters indicative for the fuel consumption and/or emission may be estimated on the basis of the accuracy of the frequency distribution that was used to calculate the fuel consumption and/or emission.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage.

Any reference signs in the claims should not be construed as limiting the scope.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. Method for obtaining emission and/or fuel consumption data associated with a road segment, the method comprising the steps of receiving by a system comprising a receiving facility at least position data from a vehicle, determine a respective value for at least a first and a second parameter indicative for a movement of the vehicle, the first and the second parameter including at least a speed and an acceleration, storing a frequency distribution having classes for respective combinations of value ranges for the first and the second parameter, updating a frequency count for a class of said frequency distribution corresponding to the determined values for the first and the second parameter, repeating the previous steps, therewith calculating an associated relative frequency for each class, the associated relative frequency for each class being the relative frequency with which a combination of respective values for the first and the second parameters was determined within the respective value ranges for each class, calculating an expected emission and/or fuel consumption for a typical vehicle on said road segment on the basis of an emission or fuel consumption model specifying an expected emission or expected fuel consumption associated with each class, wherein the expected emission or expected fuel consumption associated with each class is weighted with its associated relative frequency.

2. Method according to claim 1, comprising receiving a first indication for the vehicle type, wherein the frequency distribution to be updated is selected from a plurality of frequency distributions on the basis of the vehicle type indicated by said first indication, and wherein the model used is an emission or fuel consumption model corresponding to said vehicle type.

3. Method according to claim 1, comprising receiving a second indication for the time of the day and wherein the frequency distribution to be updated is a selected from a plurality of frequency distributions on the basis of the time of the day indicated by said second indication.

4. Method according to claim 1, comprising receiving a third indication for the day of the week and wherein the frequency distribution to be updated is a selected from a plurality of frequency distributions on the basis of the day of the week indicated by said third indication.

5. Method according to claim 1, comprising the step of normalising the frequency distribution by dividing the value accumulated in each class by the sum of values for all classes.

6. Method according to claim 1, comprising the step of maintaining a counter indicative for a number of vehicles for which position data was received and for which the frequency distribution was updated.

7. Method according to claim 6, comprising the step of normalising the frequency distribution by dividing the value accumulated in each class by the number of vehicles stored in said counter.

8. Method according to claim 1, wherein multiple frequency distributions are obtained for respective observations and a comparison is made between these multiple frequency distributions to estimate a reliability interval for respective classes of the distribution.

9. Method according to claim 8, wherein said multiple frequency distributions are obtained for observations under comparable circumstances.

10. System for obtaining emission and/or fuel consumption data associated with a road segment, the system comprising a receiving facility for receiving at least position data from vehicles, a storage facility for storing a frequency distribution having classes for respective combinations of value ranges for at least a first and a second parameter indicative for a movement, the first and the second parameter including at least a speed and an acceleration of a vehicle, an update facility for updating a frequency count for a class of said frequency distribution corresponding to determined values of the first and the second parameter for vehicles for which said position data is received, said update facility therewith calculating an associated relative frequency for each class, the associated relative frequency for each class being the relative frequency with which a combination of respective values for the first and the second parameter was determined within the respective value ranges for said class, a calculation facility for calculating an expected emission or fuel consumption for a typical vehicle on said road segment on the basis of an emission or fuel consumption model that specifies an expected emission or an expected fuel consumption for each class, the calculation facility weighting the expected emission or the expected fuel consumption for each class with its associated relative frequency.

* * * * *